(12) United States Patent
Ron et al.

(10) Patent No.: US 10,895,925 B2
(45) Date of Patent: Jan. 19, 2021

(54) TOUCH DISPLAY ALIGNMENT (71) Applicant: Microsoft Technology Licensing, LLC, Redmond, WA (US)

(72) Inventors: Uri Ron, Kfar Saba (IL); Itamar Latnik, Pishon Letzion (IL); On Haran, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 16/151,333

(22) Filed: Oct. 3, 2018

(65) Prior Publication Data

US 2020/0110493 A1     Apr. 9, 2020

(51) Int. Cl.
| | | |
|---|---|---|
| *G06F 3/041* | (2006.01) | |
| *G06F 3/0354* | (2013.01) | |
| *G06F 3/0488* | (2013.01) | |

(52) U.S. Cl.
CPC ........ *G06F 3/0412* (2013.01); *G06F 3/03545* (2013.01); *G06F 3/0416* (2013.01); *G06F 3/04883* (2013.01)

(58) Field of Classification Search
None
See application file for complete search history.

(56) References Cited

U.S. PATENT DOCUMENTS

| | | |
|---|---|---|
| 4,864,395 A | 9/1989 | Tajima |
| 5,579,107 A | 11/1996 | Wright et al. |
| 5,581,345 A | 12/1996 | Oki et al. |
| 6,323,942 B1 | 11/2001 | Bamji |
| 6,515,740 B2 | 2/2003 | Bamji et al. |
| 6,580,496 B2 | 6/2003 | Bamji et al. |
| 6,697,010 B1 | 2/2004 | Lam |
| 6,906,793 B2 | 6/2005 | Bamji et al. |
| 7,532,196 B2 | 5/2009 | Hinckley |

(Continued)

FOREIGN PATENT DOCUMENTS

| | | |
|---|---|---|
| CN | 105283823 A | 1/2016 |
| EP | 2116864 A1 | 11/2009 |

(Continued)

OTHER PUBLICATIONS

"Using the convenient "multi-display" function on Windows 10", Retrieved From: https://www.eizoglobal.com/library/basics/windows-10-multi-display-function/index.html, Oct. 22, 2016, 9 Pages.

(Continued)

*Primary Examiner* — Ifedayo B Iluyomade (57) ABSTRACT

A computing device has a digitizer control module configured to monitor signals received by receive electrodes and to detect in the monitored signals a signal from a second touch display of a second computing device in physical proximity to the computing device. The digitizer control module is configured to determine one or more locations on the first touch display at which the signals from the second touch display are received. A processor in the computing device is configured to compute a relative position of the second touch display with respect to the first touch display on the basis of the determined locations, and to use the computed relative position to treat the first touch display and the second touch display as a combined touch display.

20 Claims, 10 Drawing Sheets

(56) References Cited

U.S. PATENT DOCUMENTS

| | | |
|---|---|---|
| 7,589,316 B2 | 9/2009 | Dunki-Jacobs |
| 7,719,662 B2 | 5/2010 | Bamji et al. |
| 9,516,263 B2 | 12/2016 | Mathew et al. |
| 9,580,496 B2 | 2/2017 | Gearing |
| 9,595,550 B2 | 3/2017 | Bamji |
| 9,727,300 B2 | 8/2017 | DeLuca et al. |
| 9,880,799 B1 | 1/2018 | Bertz et al. |
| 2001/0022371 A1 | 9/2001 | Rhodes |
| 2005/0093868 A1* | 5/2005 | Hinckley ............ G06F 3/011 345/502 |
| 2006/0128087 A1 | 6/2006 | Bamji et al. |
| 2007/0127009 A1 | 6/2007 | Chen et al. |
| 2007/0247798 A1 | 10/2007 | Scott, II |
| 2008/0068583 A1 | 3/2008 | Hiraide |
| 2008/0180650 A1 | 7/2008 | Lamesch |
| 2009/0237640 A1 | 9/2009 | Krikorian et al. |
| 2010/0321275 A1 | 12/2010 | Hinckley et al. |
| 2012/0013887 A1 | 1/2012 | Xu et al. |
| 2012/0062475 A1 | 3/2012 | Locker et al. |
| 2013/0106709 A1 | 5/2013 | Simmons |
| 2013/0147760 A1 | 6/2013 | Lai et al. |
| 2015/0199165 A1* | 7/2015 | Chopde ............ G06F 3/1454 345/2.2 |
| 2015/0338943 A1* | 11/2015 | Donnelly ............ G06F 3/041 345/173 |

FOREIGN PATENT DOCUMENTS

| | | | |
|---|---|---|---|
| EP | 2157401 A1 | 2/2010 | |
| JP | H09269372 A | 10/1997 | |
| JP | 2000517427 A | 12/2000 | |
| JP | 2006214998 A | 8/2006 | |
| JP | 2008164496 A | 7/2008 | |
| JP | 2009063303 A | 3/2009 | |

OTHER PUBLICATIONS

"Office Action Issued in Korean Patent Application No. 10-2013-7001077", dated May 16, 201, 4 Pages.

"Office Action Issued in European Patent Application No. 11807282.6", dated Jul. 24, 2014, 4 Pages.

"Office Action Issued in European Patent Application No. 11807282.6", dated Jan. 27, 2015, 4 Pages.

"Search Report Issued in European Patent Application No. 11807282.6", dated Apr. 17, 2013, 8 Pages.

"Non-final Office Action Issued in U.S. Appl. No. 12/658,806", dated Sep. 9, 2013, 8 Pages.

"Non-final Office Action Issued in U.S. Appl. No. 14/449,800", dated Aug. 23, 2016, 8 Pages.

"First Office Action and Search Report Issued in Chinese Patent Application No. 201110206379.8", dated Nov. 2, 2012, 9 Pages.

"Second Office Action Issued in Chinese Patent Application No. 201110206379.8", dated May 14, 2013, 8 Pages.

"International Search Report and Written Opinion Issued in PCT Application No. PCT/US2011/42643", dated Dec. 22, 2011, 8 Pages.

"Office Action Issued in Japanese Patent Application No. 2013-520728", dated Feb. 19, 2015, 7 Pages.

"Non Final Office Action Issued in U.S. Appl. No. 15/421,821", dated Feb. 26, 2019, 9 Pages.

"International Search Report and Written Opinion Issued in PCT Application No. PCT/US2019/051371", dated Oct. 31, 2019, 12 Pages.

* cited by examiner

TOUCH DISPLAY ALIGNMENT

BACKGROUND

Touch displays are increasingly used in situations where there is more than one touch display being used at the same time for a shared task. In such situations it can be difficult to coordinate the multiple touch displays. Manual configuration of the touch displays is typically done, such as by having a user or operator configure settings in an operating system of a host computing device which controls the touch displays. However, generally speaking it is difficult, time consuming and error prone for end users to manually adjust settings of an operating system especially where the end users are novices who are not familiar with operating system settings.

The embodiments described below are not limited to implementations which solve any or all of the disadvantages of known touch displays.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a computing device with a first touch display having a digitizer panel comprising at least a plurality of receive electrodes. The computing device has a digitizer control module configured to monitor signals received by the receive electrodes and to detect in the monitored signals a signal from a second touch display of a second computing device in physical proximity to the computing device. The digitizer control module is configured to determine one or more locations on the first touch display at which the signals from the second touch display are received. A processor in the computing device is configured to compute a relative position of the second touch display with respect to the first touch display on the basis of the determined locations, and to use the computed relative position to treat the first touch display and the second touch display as a combined display.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Figure 1:
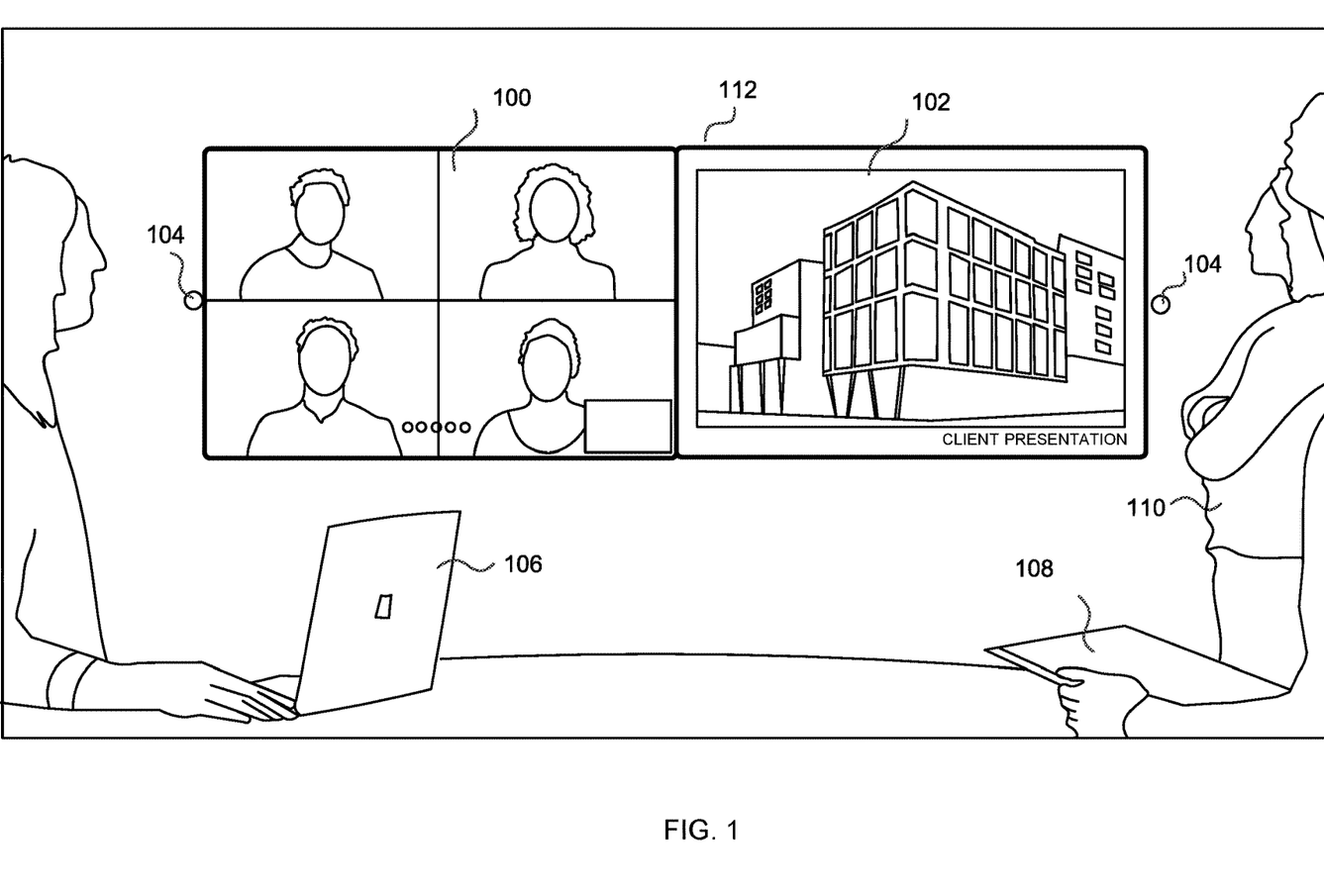
FIG. 1 is a schematic diagram of a pair of wall mounted touch display video conferencing devices being used in a meeting room.

FIG. 1 is a schematic diagram of two touch display computing devices 100, 102 mounted on a wall 112 in a meeting room. Each computing device 100, 102 has a camera 104 but this is not essential. The computing devices are in landscape orientation and placed end to end to form a single rectangle in landscape orientation.

In the example illustrated in FIG. 1 the content displayed on the two touch display computing devices 100, 102 is different. A first one of the touch display computing devices 100 is displaying images of four people who are remote parties to a video conference being held using the touch display computing devices 100, 102 which act as video conferencing apparatus. A second one of the touch display computing devices 102 is displaying an image of a building being designed by the people attending the video conference. A laptop computer 106 and a tablet computer 108 used by one or more people 110 in the room are able to join the video conference. The first and second touch display computing devices 100, 102 are able to communicate with each other over a wired or wireless connection.

Suppose one of the people 110 in the room wants to view the content displayed on touch display computing device 102 in more detail by extending the content from touch display computing device 102 over both the wall mounted touch display computing devices 100, 102. It is not straightforward to achieve the extension of the content. Also, suppose the user wants to move a mouse cursor across the displays and have the cursor continue its movement as expected when the displays are treated as a combined single display. It is not straightforward to do so. The user needs to manually change settings in an operating system of one or both of the wall mounted touch display computing devices 100, 102. In order for the operating system of touch display computing device 102 to extend its content as desired, and/or to operate the cursor as desired, it needs to know the position of the other touch display computing device relative to itself in order to send the other touch display computing device 100 correctly rendered content for display. The user will need to manually provide the relative position information which is time consuming, error prone and difficult for the user. If the video conference is ongoing the user will need to interrupt the video conference in order to change the operating system settings manually and provide the relative position information. Each time the user wants to extend the content, or stop extending the content, there will be an interruption to the video conference in order to manually adjust the settings. The technology described herein provides functionality to automatically compute the relative position information and appropriately extend the content over two or more touch display computing devices.

Figure 2:
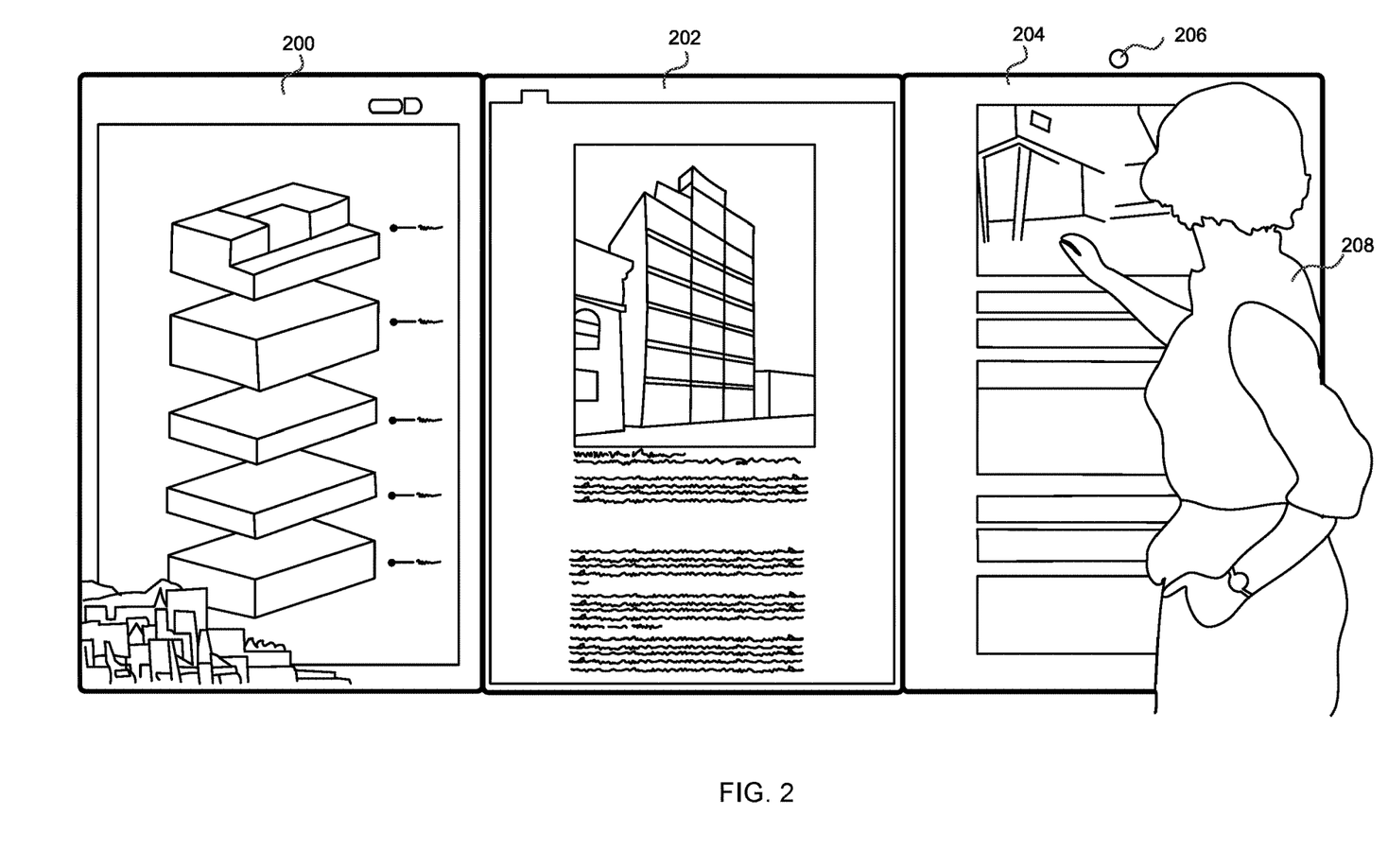
FIG. 2 is a schematic diagram of three wall mounted touch display video conferencing devices.

FIG. 2 is a schematic diagram of three touch display computing devices 200, 202, 204, each in portrait orientation and mounted on a wall side by side. One of the touch display computing devices has a camera 206 for a video conference. Suppose a user 208 wants to operate the three touch display computing devices 200, 202, 204 as a combined single interactive white board, shared with remote parties to the video conference. The user 208 has to manually configure settings of an operating system of one of the touch display computing devices 200, 202, 204 to make it a master. The master controls content rendered on the combined display formed from the three touch display computing devices. The master device has manually input information about the relative positions of the touch display computing devices so that the content is correctly rendered by the master and sent to the appropriate ones of the touch display computing devices. The technology described herein provides functionality to automatically compute the relative position information so that the master touch display computing device is able to treat the plurality of touch displays as a combined touch display.

Where a plurality of touch display computing devices are mounted on a wall adjacent to one another, there is often a significant problem in accurately mounting the devices so that they are correctly aligned. Often walls of buildings are not truly vertical and there can be difficulties in aligning the touch displays correctly. If the computing devices are not aligned accurately on the wall or other supporting surface then when they are used as a combined display there is a difficulty for the end users. The displayed content does not look correct and if the touch screen displays are used as a combined white board there can be differences between what the user is expecting to and what in fact results, for example, the movement of a mouse between displays. This is improved by the correct alignment of displays as it allows a mouse cursor to move accurately between displays and to continue its movement as expected Often the inaccuracies in alignment are not easily visible to the human eye during installation of the touch display computing devices and it can be difficult to use spirit levels and other equipment due to the limits of manual dexterity.

Figure 3:
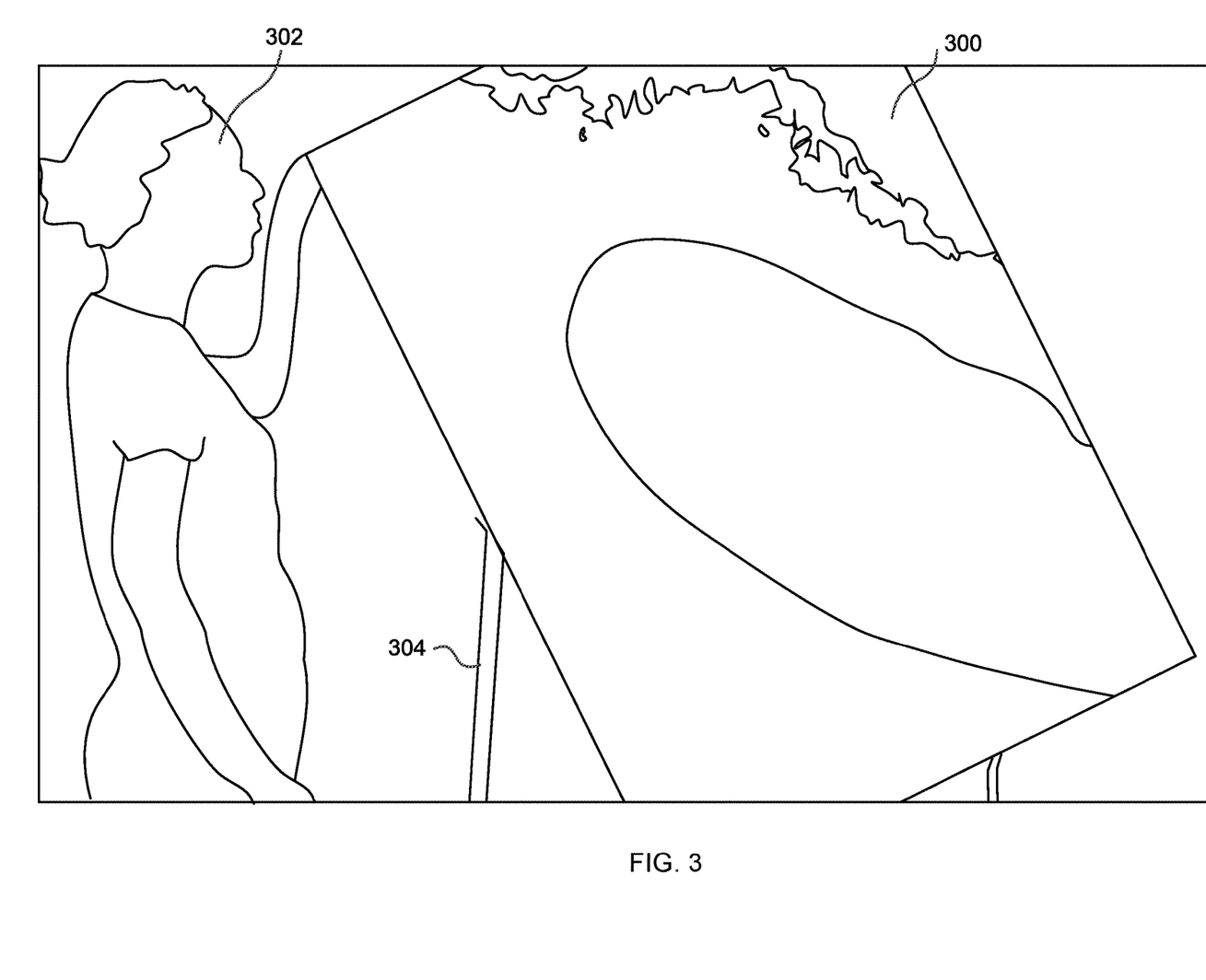
FIG. 3 is a schematic diagram of a rectangular touch display video conferencing device, rotatably mounted on a stand and being transitioned from portrait orientation to landscape orientation.

FIG. 3 shows how the touch display computing device is rotatably mounted in some cases, such as on a stand or a wall. Rotatable mounting gives versatility since portrait or landscape orientations of a rectangular touch display computing device are moved between and orientations between portrait and landscape are possible. Where a plurality of touch display computing devices are being used together, if one or more of the touch display computing devices is rotatably mountable the problem of how to detect relative position of the touch display computing devices is complex.

Figure 4:
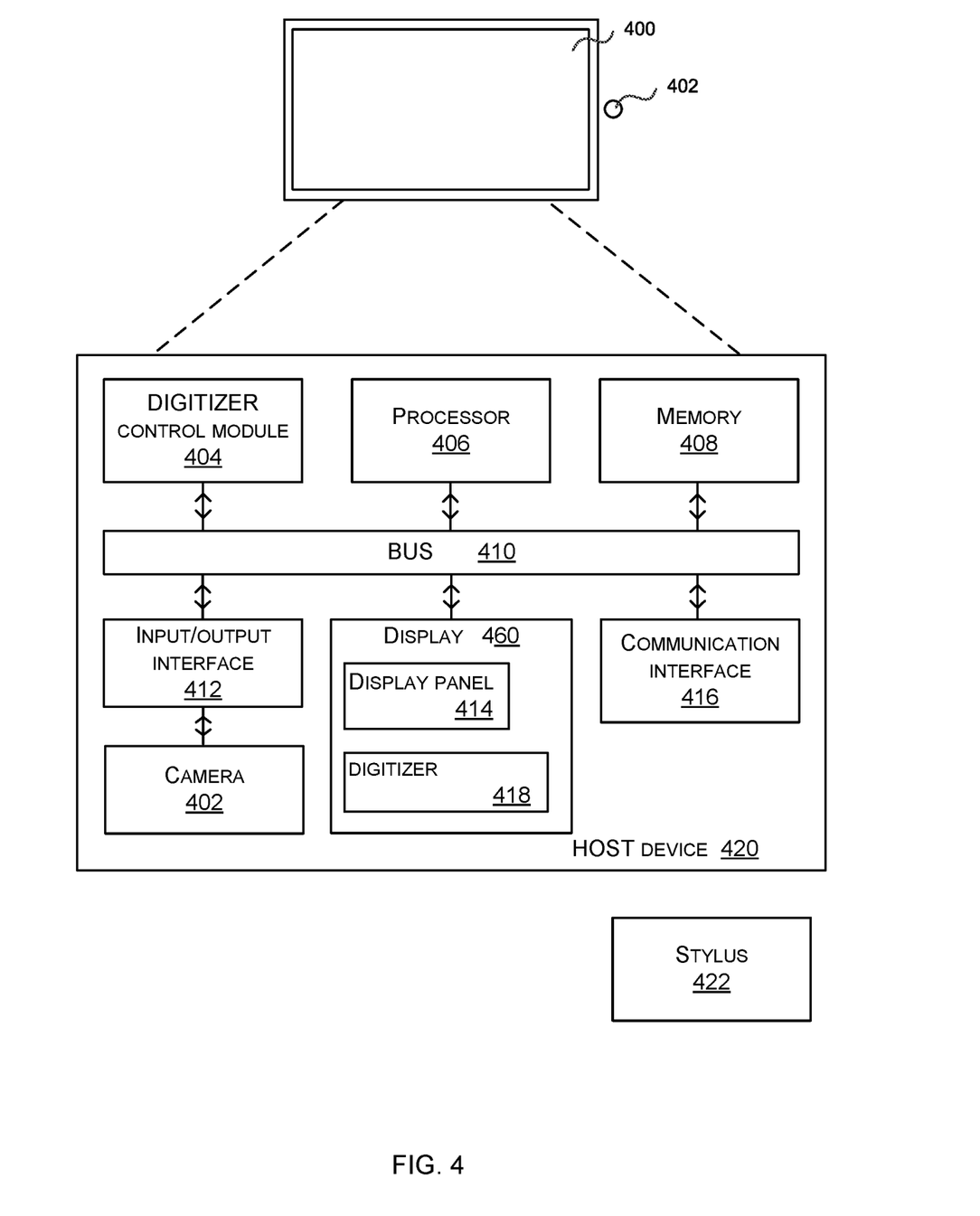
FIG. 4 is a schematic diagram of a touch display computing device.

FIG. 4 is a schematic diagram of a host device 400 which hosts a digitizer 418 and digitizer control module 404. The host device 400 is a touch display computing device with an optional camera 402. Together the digitizer 418 and the digitizer control module 404 form a digitizer device. The host device 420 may be a smart phone, tablet computer, wall-mountable video conferencing device, or any other type of host with a digitizer 418 where a plurality of the host devices are suitable for using adjacent one another in order to create a combined display from displays of the individual host devices.

The host device has at least one processor 406, a memory 408, a communication interface 416 such as a radio communications transceiver, a network card, or any other communication interface for enabling wired or wireless communications with other computing entities. The host device has an input/output interface 412 for controlling outputs from the host device and for controlling inputs received at the host device 420. The host device 420 has a display 460 which comprises a display panel 414 which is located in front of or behind the digitizer 418 such as in a conventional smart phone or tablet computer. A bus 410 connects various of the components of the host device 420 such as the digitizer control module 404, the processor 406, the memory 408, the input/output interface 412, the display 460 and the communication interface 416.

Figure 5:
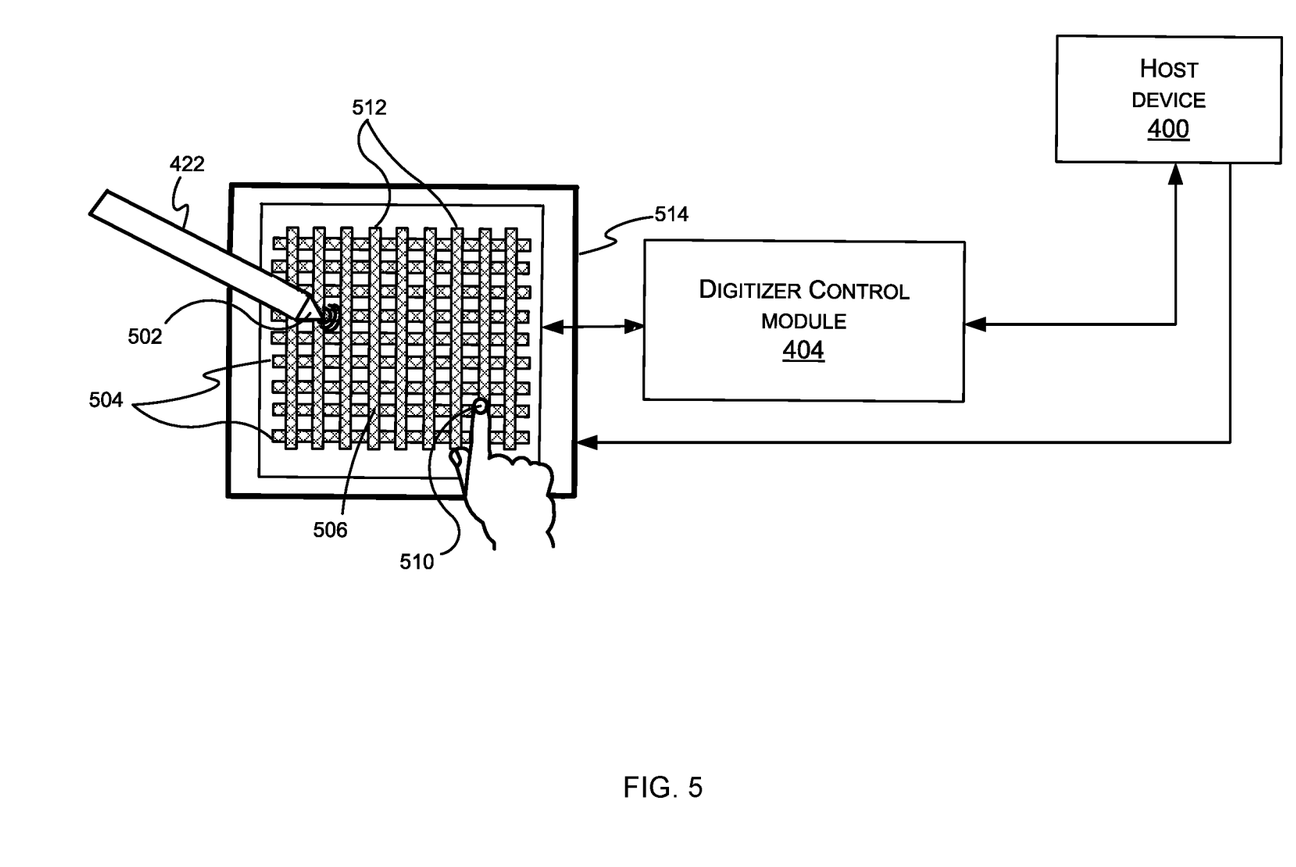
FIG. 5 is a schematic diagram of a digitizer of a touch display computing device.

The digitizer 418 comprises a first array of electrodes arranged substantially parallel with one another and a second array of electrodes arranged substantially parallel with one another. In some implementations the electrodes in the first array are row electrodes positioned substantially perpendicular to the electrodes in the second array (column electrodes) to form a grid or matrix as illustrated in FIG. 5. While the row electrodes may be referred to as transmit electrodes and the column electrodes may be referred to as receive electrodes, these designations may be reversed with no change in meaning. However, it is not essential for the electrodes to be arranged in a grid. In some cases the row electrodes intersect each column electrode at an angle that is not perpendicular thereby forming a sensor having the form of a parallelogram. In some cases the electrodes form a more complex pattern in which any two rows or columns are not necessarily parallel, or not necessarily laid out along straight lines. In some cases the electrodes are formed as pads rather than elongate electrodes.

Where the sensor panel is used in front of or within a display (such as a liquid crystal display) the digitizer 418 is substantially transparent to visible wavelengths of light. Specifically, the electrodes in the digitizer are made from transparent conductive material (for example, indium tin oxide), or alternatively, are made from opaque material but with traces so small as to be inconspicuous. The digitizer 418 is used to measure the capacitance from each row to each column of the electrodes in order to measure the position of an input medium such as a finger, or stylus 422.

FIG. 5 shows the digitizer 514 in more detail in a case where the electrodes of the digitizer are arranged in a grid to form a grid based capacitive sensor. Stylus 422 transmits an electromagnetic signal which is detected by the capacitive sensor. Touch of one or more fingers 510 or other conductive objects is also detectable by the capacitive sensor. The stylus 422 transmits one or more signal bursts and/or pulses that are transmitted at a defined repetition rate. In some examples, a control module 404 of the digitizer manages a synchronization signal for synchronizing signal bursts emitted by stylus 422 with sampling windows for sampling output from the digitizer 514. Optionally one or more signal bursts and/or pulses are transmitted by stylus 422 including information regarding operation of stylus 422 and/or pressure applied on a tip 502 of the stylus. The signal bursts transmitted by stylus 422 are picked up by one or more of the electrodes of the digitizer 514 on both the horizontal and vertical axes of the grid. In some examples the information is decoded by digitizer circuitry in the control module 404. The location of the stylus tip is computed by the control module 404 and sent to host device 400.

Optionally a mutual capacitance detection method and/or a self-capacitance detection method are applied on the digitizer 514 for sensing interaction with fingertip 510. The digitizer control module 404 sends a triggering pulse and/or interrogation signal to one or more transmit electrodes 504 of the digitizer and to sample output from receive electrodes 512, in response to the triggering and/or interrogation. In some embodiments some or all of the electrodes 504 along one axis of the grid are interrogated simultaneously or in a consecutive manner, and in response to each interrogation, outputs from electrodes 512 on the other axis are sampled. This scanning procedure provides for obtaining output associated with each junction 506 of the grid. The output from each junction of the grid provides for detecting one or more conductive objects such as fingertips touching and/or hovering over the digitizer at the same time (multi touch). In some examples, the digitizer control module 404 alternates between scanning the digitizer 514 for detection of one or more fingertips and sampling outputs on both the horizontal and vertical electrodes for location of a signal transmitted by the stylus 422.

The stylus 422 has a tip transmitter located in its tip 502 and the digitizer is able to detect the position of the stylus tip with respect to the digitizer grid by detecting the signal transmitted by the tip transmitter.

In various examples described herein the digitizer control module 404 is configured to drive one or more of the transmit electrodes to emit an alignment signal for use in aligning the touch display computing device with one or more other touch display computing devices. The alignment signal comprises an identifier of the touch display computing device in some examples.

The digitizer control module 404 alternates between transmitting the alignment signal and at least:

scanning the digitizer 514 for detection of one or more fingertips;

sampling outputs on both the horizontal and vertical electrodes for location of a signal transmitted by the stylus 422; and sampling outputs on both the horizontal and vertical electrodes for location of alignment signals received from other touch display computing devices.

Figure 6A:
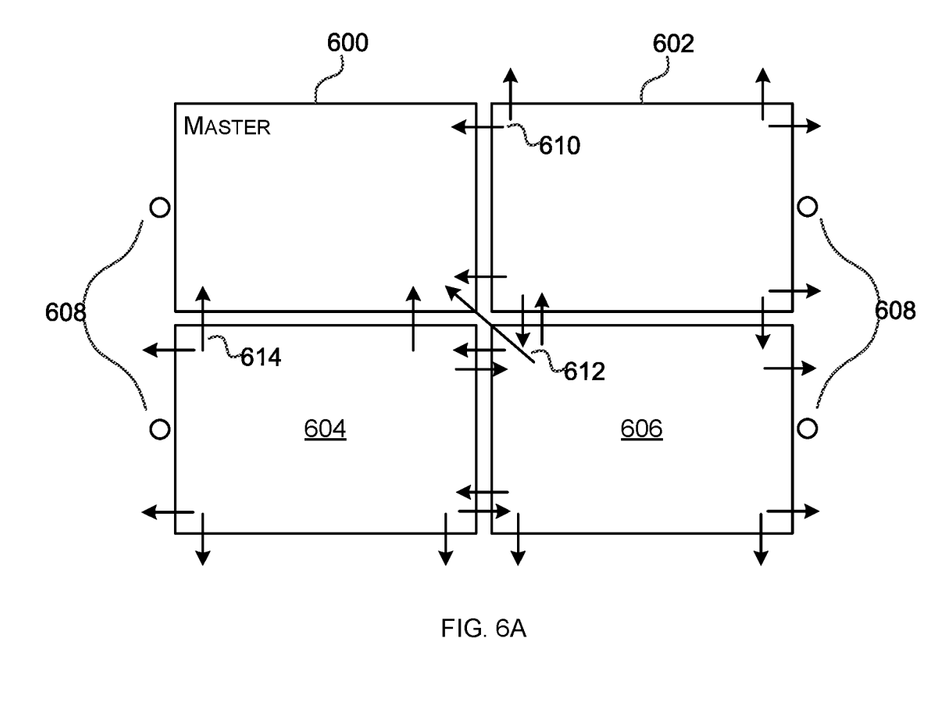
FIG. 6A is a schematic diagram of four touch display computing devices which are arranged in a grid.

FIG. 6A is a schematic diagram of four touch display computing devices 600, 602, 604, 606 supported on a flat surface and placed in a grid arrangement. The touch display computing devices are the same size and shape as one another and are rectangular. The touch display computing devices are adjacent one another so as to form a rectangle which is larger than each of the individual touch display computing devices. The touch display computing devices are in communication with one another over wired or wireless links which are not visible in FIG. 6A since, in the case of wired connections these are on the reverse of the touch display computing devices. One of the touch display computing devices 600 is a master which controls a combined display which is formed from the aggregate of the four touch displays of the four touch display computing devices 600, 602, 604, 606. In order to establish one of the touch display computing devices 600 as a master an operator configures a setting on installation of the touch display computing devices. Alternatively, the touch display computing devices communicate between themselves and randomly assign one of the touch display computing devices to be master. The touch display computing devices which are not the master are referred to herein as workers.

Each of the touch display computing devices has a digitizer as part of its touch display. As described in more detail later with reference to FIG. 8, the master touch display computing device monitors receive electrodes of its digitizer to detect signals transmitted by transmit electrodes of the other touch display computing devices. The workers each transmit, using one or more transmit electrodes of their digitizers, an identifier signal which identifies the particular worker transmitting the signal. In some examples, all the transmit electrodes of a given worker are used to transmit the identifier signal. In other examples, the transmit electrodes used to transmit the identifier signal are selected to be at the extremities of the particular worker concerned. That is, electrodes at the edges of the touch display of the particular worker are used to transmit the identifier signal in some cases.

The master touch display computing device detects the transmitted identifier signals of the worker devices and computes locations on the master touch display computing device where the particular identifier signals are detected. Using the computed locations associated with the identifiers, the master computing device computes the relative locations of the worker touch display computing devices.

In the example of FIG. 6A the master touch display computing device 600 receives identifier signal 610 from worker touch display computing device 602 and is able to infer that worker touch display computing device 602 is on its left hand side.

Master touch display computing device receives identifier signal 614 from worker touch display computing device 604 and is able to infer that worker touch display computing device 604 is below it.

Master touch display computing device receives identifier signal 612 from touch display computing device 606 and is able to infer that worker touch display computing device 606 is diagonally opposite in the grid, since it already knows the positions of worker touch display computing devices 602 and 604.

Master touch display computing device 600 optionally does not transmit an identifier signal since it is not essential to do so and power can be saved by not transmitting.

Once the master touch display computing device 600 has computed the relative positions of the worker touch display computing devices it is able to treat its own display and the displays of the workers as a combined display. It does so by rendering content appropriate for each of the displays and sending the rendered content to the worker touch display computing devices for display at those devices.

In some examples, the master touch display computing device 600 has optional additional information to compute the relative positions of the worker display computing devices. The optional additional information comprises one or more of: size and shape of the master touch display computing device, size and shape of the worker touch display computing devices, signal strength of the received identifier signals, knowledge that the transmitting electrodes used to transmit the identifier signals are at the edges of the worker touch display computing devices. As more of the types of optional additional information are used the accuracy of the relative position computed increases. Since the resolution of the transmit and receive electrodes of the digitizers of the touch display computing devices is on the order of a few millimeters in many case, it is possible to compute the relative position information to a fine scale. The identifier signals transmitted by the worker touch display computing devices are configured to reduce interference such as by using frequency or time multiplexing.

Figure 6B:
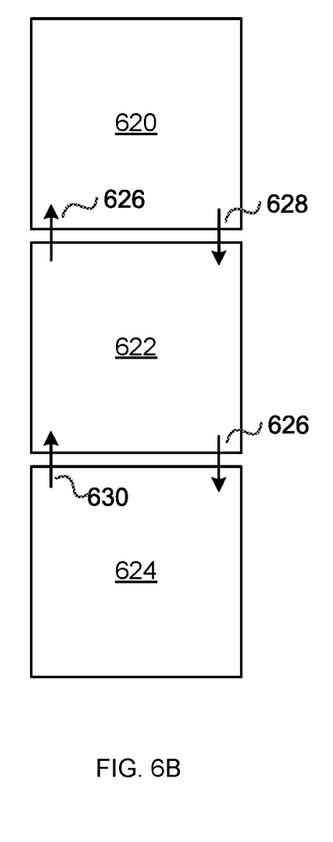
FIG. 6B is a schematic diagram of three touch display computing devices arranged in a column.

In the example of FIG. 6B there is no master initially. Here there are three touch display computing devices 620, 622, 624 arranged in a column and connected using wires or wirelessly. Device 620 transmits its identifier signal 628 to device 622 and receives identifier signal 626 from device 622. Device 622 transmits its identifier signal 626 to device 624 and receives an identifier signal 630 from device 624. Device 620 is able to compute the relative position of device 622 with respect to itself. Device 622 is able to compute the relative position of device 620 and device 624 with respect to itself. Device 624 is able to compute the relative position of device 622 with respect to itself.

As a result device 622 is able to become a master and treat the displays of devices 620 and 624 together with its own display as a single combined display. Another option is for device 620 to become as master and treat its own display and that of device 622 as a single combined display. Another option is for device 624 to become a master and treat its own display and that of device 622 as a single combined display.

Figure 7A:
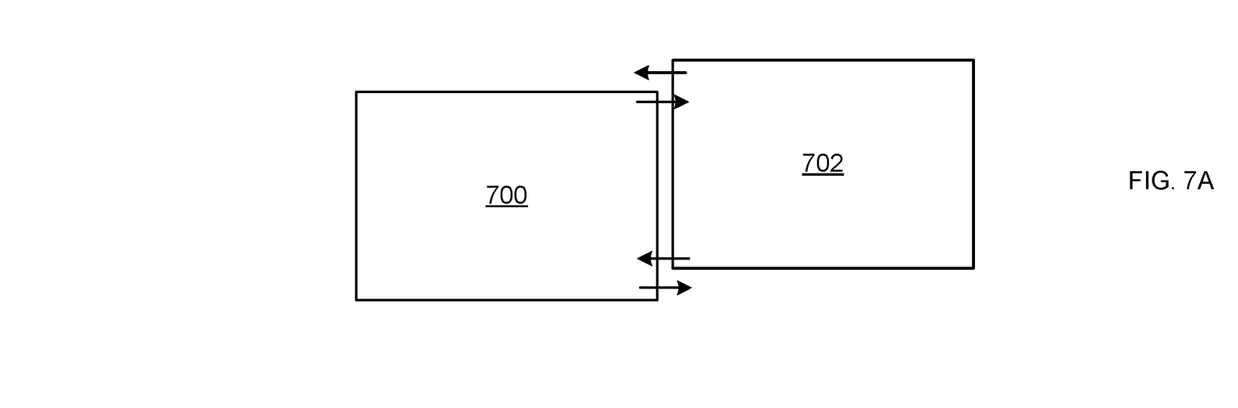
FIG. 7A is a schematic diagram of two touch display computing devices arranged end to end but with some misalignment.

FIG. 7A is an example with two rectangular touch display computing devices that are being installed on a planar supporting surface and are out of alignment. As indicated by the arrows, each device is aware of the other device as a result of the transmitted identifier signals transmitted and received in the same manner as described above for FIG. 6A. The size and shape of the computing devices is available, and if it is known that only transmit electrodes at the edges of the digitizers are being used, then the misalignment is inferred by one or both of the computing devices. Feedback about the misalignment is given to users, such as audible feedback or visual feedback displayed on the touch displays. The feedback encourages the users to move the devices into alignment during the installation process and since the feedback is given iteratively the user is able to find the correct alignment by trial and error and without the need for spirit levels and other manual measurement equipment.

Figure 7B:
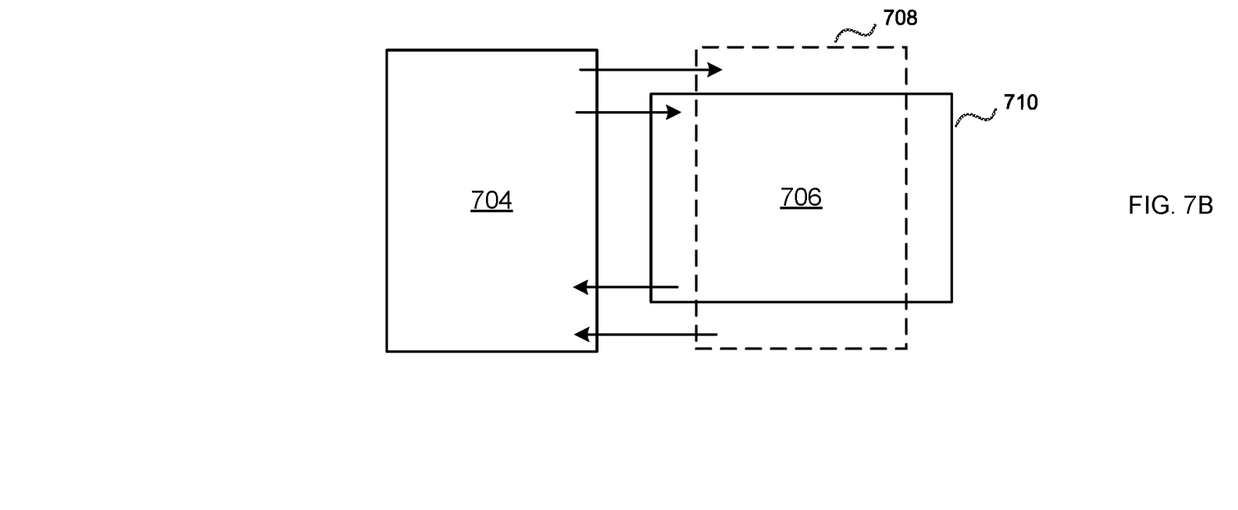
FIG. 7B is a schematic diagram of a first touch display computing device in portrait orientation and a second touch display computing device adjacent to the first touch display computing device.

FIG. 7B has the situation where there are two touch display computing devices 704, 706 one of which is fixed in portrait orientation and one of which is in rotatably mounted and is initially in landscape orientation as indicated at 710. The rotatable touch display computing device 706 is rotated into portrait orientation as indicated by the dotted lines 708. The fixed touch display computing device 704 is able to detect the orientation of the rotatably mounted computing device 706 using the identifier signals transmitted by transmitting electrodes at edges of a digitizer of the rotatably mounted computing device and by having knowledge of the size and shape of the rotatably mounted computing device 706. The fixed touch display computing device 704 acts as a master and is able to treat its own display and that of the rotatably mounted computing device as a single combined display for example, as a single interactive white board, or by extending content displayed on its own display over the display of touch display computing device 706 as well as its own display according to the detected orientation and relative position.

Figure 8:
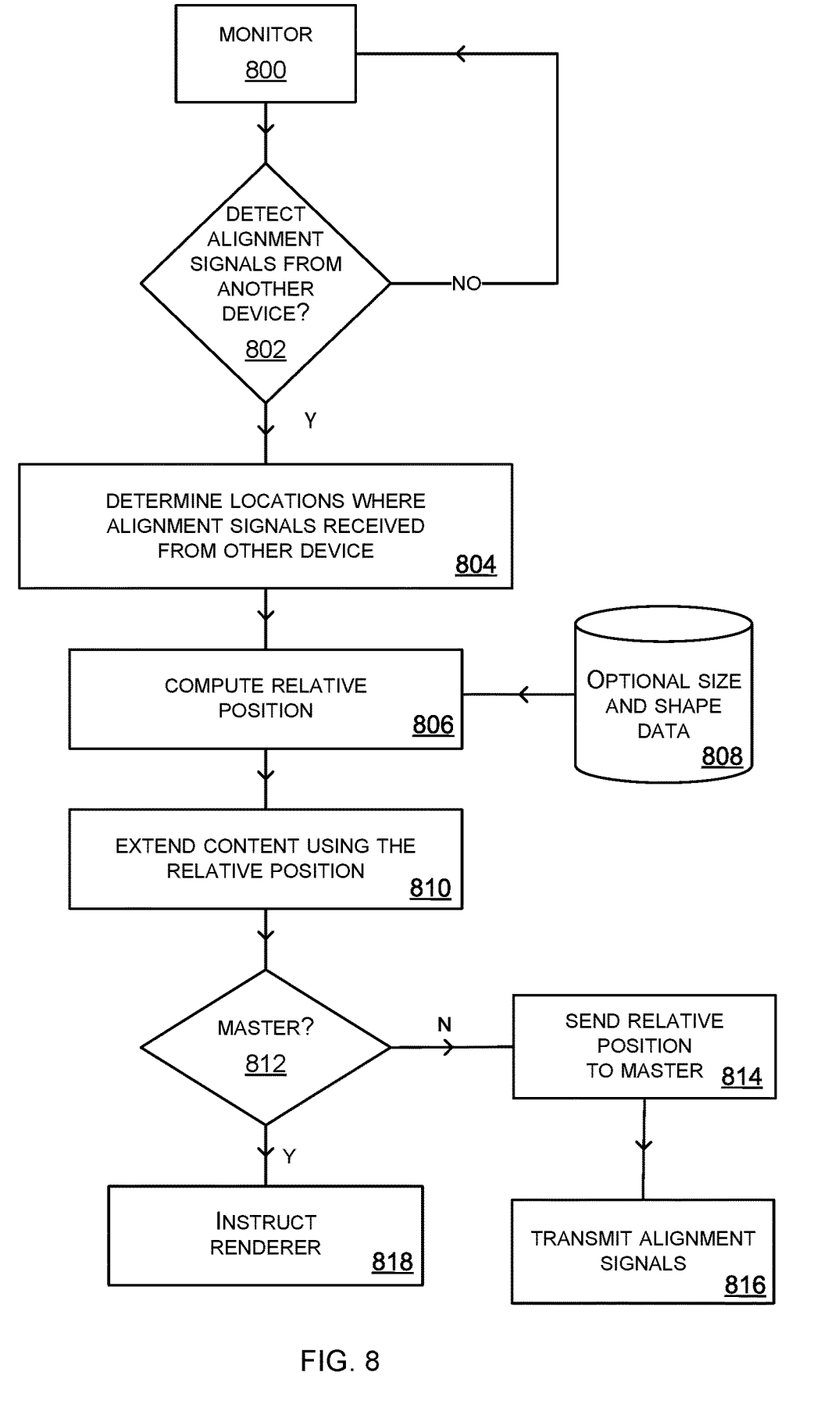
FIG. 8 is a flow diagram of a method performed at a touch display computing device.

FIG. 8 is a flow diagram of a method performed at a touch display computing device such as that of any of FIGS. 4 to 7. A digitizer control module of the touch display computing device monitors 800 for signals received at receive electrodes of a digitizer of the touch display. If the digitizer control module detects 802 alignment signals from another touch display computing device it proceeds to a determining operation 804. If no alignment signals are detected the digitizer control module continues to monitor 800.

The determining operation 804 comprises determining locations on the touch display where alignment signals are received from one or more other touch display computing devices.

A processor in the touch display computing device computes a relative position of each of the other touch display computing devices with respect to the touch display computing device. To compute the relative positions the processor uses at least the determined locations of the received alignment signals from each of the respective other touch display computing devices. Optional additional types of information which are used to compute the relative positions are one or more of: size and shape of one or more of the touch display computing devices, signal strengths of the received alignment signals, knowledge of locations in the other touch display computing devices of transmitting electrodes used to transmit the alignment signals.

The processor checks 812 if it is the master of the plurality of touch display computing devices by checking settings in the operating system or by checking user input. If the processor is the master it instructs a renderer at the touch display computing device to extend 810 content displayed at the touch display computing device so that it extends over one or more of the other touch display computing devices in addition to the touch display computing device itself. Alternatively or in addition, the processor uses its knowledge of the relative positions of the other touch display computing devices to treat the plurality of touch displays as a combined touch display.

If the processor is not the master at check 812, the processor sends 814 the relative position information to one of the other touch display computing devices which is the master. The master receives the relative position information and uses it to treat the plurality of touch displays as a combined display.

In the case that the processor is not the master it instructs the digitizer control module to drive the transmit electrodes to transmit 816 alignment signals.

Figure 9:
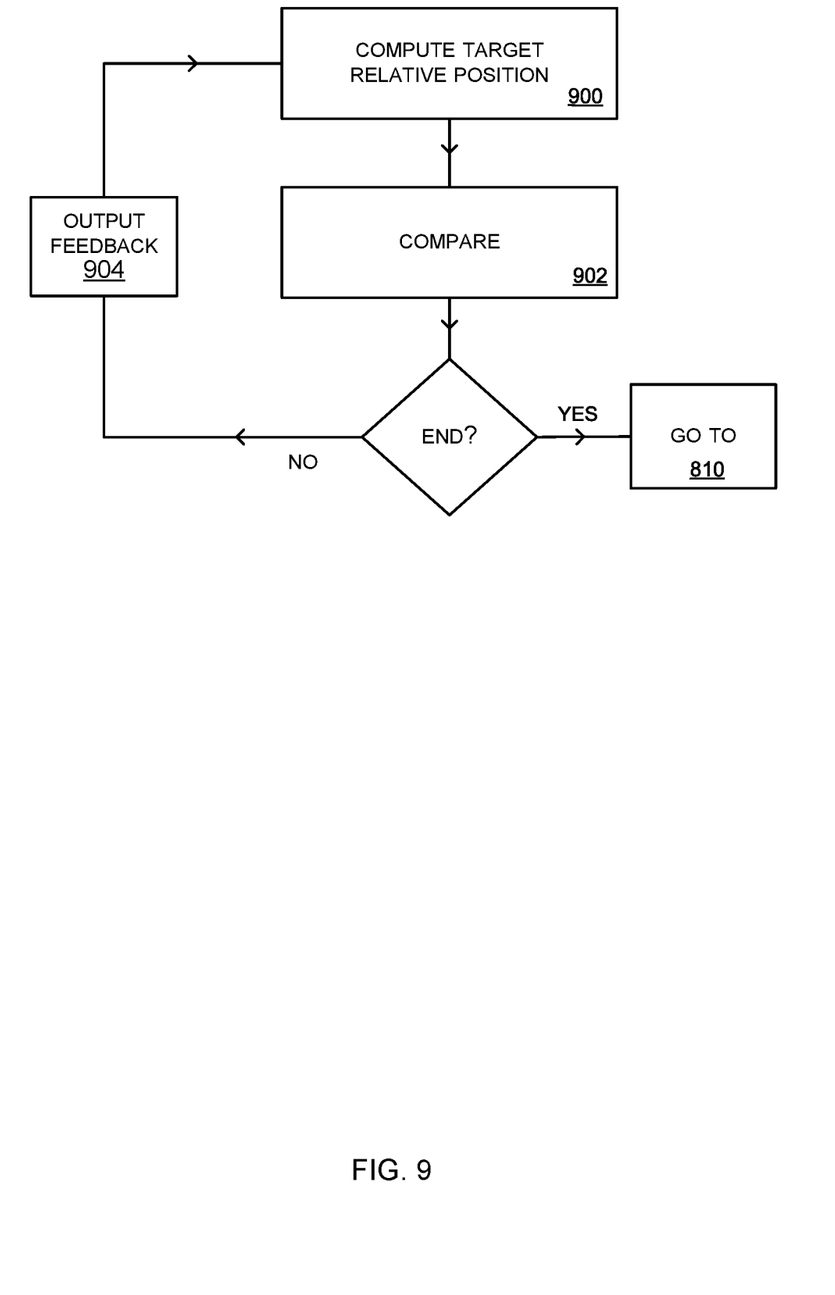
FIG. 9 is a flow diagram of an optional addition to the method of FIG. 8.

In some, but not all, embodiments the method of FIG. 8 is adapted to incorporate a feedback mechanism as illustrated in FIG. 9. The operations of FIG. 9 are inserted into the method of FIG. 8 immediately after operation 806 which is the operation where the relative position is computed.

The processor of the touch display computing device computes 900 a target relative position using one or more of: rules specifying target positions which apply in the case of ranges of values of the relative position, user input, operating system settings, knowledge of the size and shape of the plurality of touch display computing devices. The target relative position is a relative position of the touch display computing devices which is desired, such as vertically aligned in a column in the case of FIG. 6B, arranged in a rectangular grid in the case of FIG. 6A, arranged in a row in the case of FIG. 2 and so on. The processor compares 902 the target relative position and the relative position computed in the process of FIG. 8. If there is no difference, or the difference is below a threshold the process returns to operation 810 of FIG. 8. If the difference is above the threshold then feedback is output 904 to a user, such as auditory feedback and/or visual feedback. The feedback indicates to the user the presence and/or magnitude of the difference. In some cases the feedback indicates to the user which direction to move one or more of the touch display computing devices. The process of FIG. 9 repeats so that the user is able to adjust the physical positions of the touch display computing devices and, by trial and error, reach the desired target relative position.

In another embodiment when the alignment mode is entered, a first one of the touch display computing devices displays alignment points at a plurality of specified points on its touch display. The plurality of specified points are in two or more corners of the touch display or are spaced apart along a same edge of the touch display. A user swipes, using an object such as a pen or a finger, from a displayed alignment points to a second touch display computing device which is adjacent to the first touch display computing device. The displayed alignment point which was the starting point is known. The second touch display computing device detects an entry point at which the swipe enters the second touch display. The starting point and the entry point are deemed to be adjacent points. The process is repeated for the second displayed alignment point. Together with knowledge about the size and shape of the first and second touch displays it is then possible to compute the relative position of the first and second touch displays.

Figure 10:
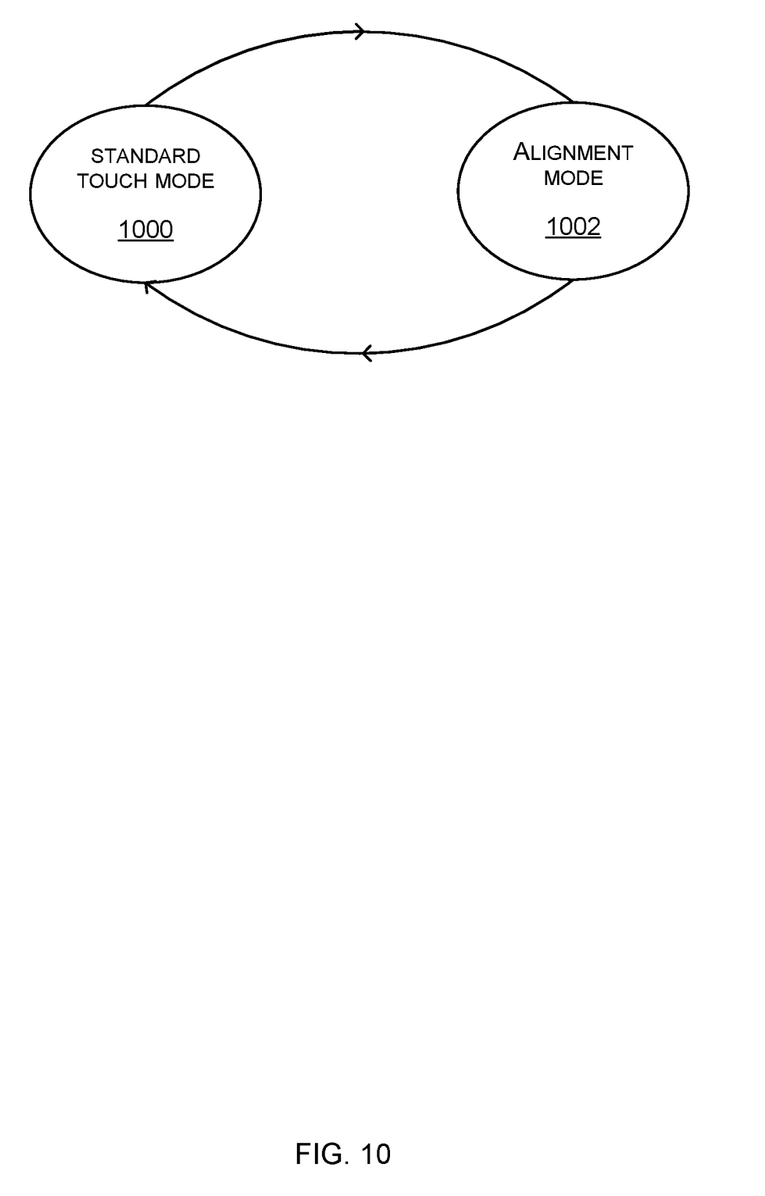
FIG. 10 is a schematic diagram of two modes of operation of a touch display computing device and illustrating transitions between the modes.

In some, but not all examples, the touch display computing device processor and digitizer control module are operable in two modes, a standard touch mode 1000 and an alignment mode 1002. The processor and digitizer control module only operate in the same mode at any one time and only operate in a single mode at any one time. When the processor and digitizer control module are in the standard touch mode 1000 the touch display operates as a standard touch display by detecting multi-touch and hover input from users and/or stylus pens. In the standard touch mode 1000 no alignment signals are sent by the touch display computing device. In the alignment mode 1002 the processor and digitizer control module are operable to drive the transmit electrodes to transmit alignment signals at appropriate times in addition to the standard touch mode operation of the digitizer.

The processor and digitizer control module transition between the modes 1000, 1002 according to one or more of the following criteria: user input, power on of the computing device, a change in detection of one or more other computing devices in physical proximity to the computing device. Physical proximity is where computing devices are able to detect one another using one or more of near field communications, capacitance detection, wireless detection or other methods such as where the computing devices are in the same room.

Alternatively, or in addition, the functionality described with reference to FIGS. 8 to 10 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Alternatively or in addition to the other examples described herein, examples include any combination of the following:

Clause 1. A computing device comprising:
 a first touch display having a digitizer panel comprising at least a plurality of receive electrodes;
 a digitizer control module configured to monitor signals received by the receive electrodes and to detect in the monitored signals a signal from a second touch display of a second computing device in physical proximity to the computing device;
 the digitizer control module configured to determine one or more locations on the first touch display at which the signals from the second touch display are received;
 a processor configured to compute a relative position of the second touch display with respect to the first touch display on the basis of the determined locations, and to use the computed relative position to treat the first touch display and the second touch display as a combined display.

In the present technology, the digitizer control module 404 and processor 406 of the disclosure operate in an "unconventional manner" to achieve the ability to compute a relative position of the second touch display with respect to the first touch display in an accurate, practical manner.

The digitizer control module 404 and processor 406 improve the functioning of the underlying computing device by computing a relative position of the second touch display with respect to the first touch display on the basis of both the determined locations and the strength of the signal, and to using the computed relative position to treat the first touch display and the second touch display as a combined display.

Clause 2. The computing device of clause 1 wherein the digitizer control module is configured to measure a strength of the signals from the second touch display and the processor is configured to compute the relative position of the second touch display with respect to the first touch display on the basis of both the determined locations and the strength of the signals:

Clause 3. The computing device of clause 1 or claim 2 wherein the processor is configured to compute an orientation of the second touch display with respect to the first touch display using specified information about the size and shape of the first touch display and the size and shape of the second touch display.

Clause 4. The computing device of any preceding clause 1 wherein the processor is configured to obtain the specified information about the size and shape of the second touch display by obtaining an identifier of the second touch display from the monitored signals and looking up the size and shape of the second touch display in a store holding associations between identifiers and sizes and shapes of touch displays.

Clause 5. The computing device of any preceding clause 1 wherein the digitizer panel of the first touch display has a plurality of transmit electrodes, and wherein the digitizer control module is configured to drive the transmit electrodes to transmit a signal comprising an identifier of the first touch display.

Clause 6. The computing device of any preceding clause 1 wherein the digitizer control module is configured to detect in the monitored signals a signal from a third touch display of a third computing device in physical proximity to the computing device;
 the digitizer control module configured to identify from the monitored signals, signals from the third touch display and to determine one or more locations on the first touch display at which the signals from the third touch display are received;
 and wherein the processor is configured to compute a relative position of the third touch display with respect to the first touch display and the second touch display on the basis of the determined locations.

Clause 7. The computing device of any preceding clause 1 wherein the digitizer control module operates in either a standard touch mode or an alignment mode; and wherein the processor is configured to instruct the digitizer control module to move from the standard touch mode to the alignment mode according to one or more of: user input, power on of the computing device, a change in detection of one or more other computing devices in physical proximity to the computing device.

Clause 8. The computing device of any preceding clause 1 wherein the processor is configured to compare the computed relative position with a specified relative position and to provide feedback to a user of the computing device based on the results of the comparison.

Clause 9. The computing device of any preceding clause 1 which is a wall mountable video conferencing apparatus and wherein the second computing device is a second wall mountable video conferencing apparatus.

Clause 10. The computing device of any preceding clause 1 which is a rectangular, planar computing device comprising a rotatable mounting structure which enables the computing device to be rotated from a portrait orientation to a landscape orientation.

Clause 11. A method performed by a computing device comprising:
  monitoring signals received by receive electrodes in a digitizer panel of a touch display of the computing device;
  detecting in the monitored signals a signal from a second touch display of a second computing device in physical proximity to the computing device;
  determining one or more locations on the first touch display at which the signals from the second touch display are received;
  computing a relative position of the second touch display with respect to the first touch display on the basis of the determined locations;
  using the computed relative position to treat the first touch display and the second touch display as a combined touch display.

Clause 12. The method of clause 11 comprising measuring a strength of the signals from the second touch display and computing the relative position of the second touch display with respect to the first touch display on the basis of both the determined locations and the strength of the signals.

Clause 13. The method of clause 11 or clause 12 comprising computing an orientation of the second touch display with respect to the first touch display using specified information about the size and shape of the first touch display and the size and shape of the second touch display.

Clause 14. The method of any of clauses 11 to 13 comprising obtaining the specified information about the size and shape of the second touch display by obtaining an identifier of the second touch display from the monitored signals and looking up the size and shape of the second touch display in a store holding associations between identifiers and sizes and shapes of touch displays.

Clause 15. The method of any of clauses 11 to 14 comprising driving transmit electrodes of the digitizer panel to transmit a signal comprising an identifier of the first touch display.

Clause 16. The method of any of clauses 11 to 15 comprising instructing the digitizer control module to move from a standard touch mode to an alignment mode according to one or more of: user input, power on of the computing device, a change in detection of alignment signals from one or more other computing devices in physical proximity to the computing device.

Clause 17. The method of any of clauses 11 to 16 comprising instructing the digitizer control module to move from an alignment mode to a standard touch mode according to one or more of: user input, absence of detection of alignment signals from other computing devices in physical proximity to the computing device.

Clause 18. The method of any of clauses 11 to 17 comprising comparing the computed relative position with a specified relative position and to providing feedback to a user of the computing device based on the results of the comparison.

Clause 19. The method of clause 17 wherein the feedback is auditory.

Clause 20. A computing device comprising:
  a first touch display having a digitizer comprising at least a plurality of receive electrodes;
  a digitizer control module configured to monitor signals received by the receive electrodes and to detect a signal from a second touch display of a second computing device;
  the digitizer control module configured to determine one or more locations on the first touch display at which the signals from the second touch display are received;
  a processor configured to compute a relative position of the second touch display with respect to the first touch display on the basis of the determined locations, and to use the computed relative position to extend content displayed on the first touch display over both the first touch display and the second touch display.

In an example there is a method performed by a computing device comprising:
  means for monitoring signals received by receive electrodes in a digitizer panel of a touch display of the computing device;
  means for detecting in the monitored signals a signal from a second touch display of a second computing device in physical proximity to the computing device;
  means for determining one or more locations on the first touch display at which the signals from the second touch display are received and measuring a strength of the signals from the second touch display;
  means for computing a relative position of the second touch display with respect to the first touch display on the basis of both the determined locations and the strength of the signals;
using the computed relative position to treat the first touch display and the second touch display as a combined touch display.

In an example, the means for monitoring signals is a processor of the computing device with suitable instructions for monitoring the signals. In an example, the means for detecting the signal from the second touch display is the processor and the means for determining the one or more locations is also the processor. The means for computing the relative position is the processor in the computing device.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computing device comprising:
   a first touch display having a digitizer panel comprising at least a plurality of receive electrodes;
   a digitizer control module configured to monitor signals received by the receive electrodes and to detect in the monitored signals a signal from a second touch display of a second computing device in physical proximity to the computing device;
   the digitizer control module configured to determine one or more locations on the first touch display at which the signal from the second touch display are received, and to measure a strength of the signal from the second touch display;
   a processor configured to compute a relative position of the second touch display with respect to the first touch display based on the determined locations and the strength of the signal received from the second touch display, the processor configured to provide, to a user, feedback that indicates a presence of a misalignment between the first and second touch displays.

2. The computing device of claim 1 wherein the digitizer panel of the first touch display has a plurality of transmit electrodes, and wherein the digitizer control module is configured to drive the transmit electrodes to transmit a signal comprising an identifier of the first touch display.

3. The computing device of claim 1 wherein the digitizer control module operates in either a standard touch mode or an alignment mode; and wherein the processor is configured to instruct the digitizer control module to move from the standard touch mode to the alignment mode according to one or more of: user input, power on of the computing device, a change in detection of one or more other computing devices in physical proximity to the computing device.

4. The computing device of claim 1 wherein the processor is configured to compare the computed relative position with a target relative position and to provide the feedback to the user based on results of the comparison.

5. The computing device of claim 1 wherein the processor is configured to display a plurality of alignment marks on the first touch display and to prompt a user to swipe starting from one of the alignment marks and ending on the second touch display.

6. The computing device of claim 5 wherein the processor is configured to detect a point of entry of the swipe on the second touch display and to compute a relative alignment of the first and second touch displays by taking the one of the alignment marks and the point of entry as being adjacent one another.

7. A method performed by a computing device comprising:
   monitoring signals received by receive electrodes in a digitizer panel of a first touch display of the computing device;
   detecting in the monitored signals a signal from a second touch display of a second computing device in physical proximity to the computing device;

determining one or more locations on the first touch display at which the signals from the second touch display are received and measuring a strength of the signals from the second touch display;

computing a relative position of the second touch display with respect to the first touch display based on the determined locations and the strength of the signals received from the second touch display; and providing, to a user, feedback that indicates a presence of a misalignment between the first and second touch displays.

8. The method of claim 7 comprising obtaining an identifier of the second touch display from the monitored signals and looking up a size and shape of the second touch display in a store holding associations between identifiers and sizes and shapes of touch displays.

9. The method of claim 7 comprising comparing the computed relative position with a target relative position and providing the feedback to the user based on the results of the comparison.

10. The method of claim 7 wherein the feedback comprises auditory or visual feedback or both.

11. A computing device comprising:

a first touch display having a digitizer comprising at least a plurality of receive electrodes;

a digitizer control module configured to monitor signals received by the receive electrodes and to detect a signal from a second touch display of a second computing device;

the digitizer control module configured to determine one or more locations on the first touch display at which the signals from the second touch display are received, and to measure a strength of the signals;

a processor configured to compute a relative position of the second touch display with respect to the first touch display based on the determined locations and the strength of the signals, the processor configured to compare the computed relative position with a target relative position and to provide feedback to a user upon a difference between the computed relative position and the target relative position being above a threshold, wherein the feedback indicates a presence or magnitude, or both, of the difference.

12. The computing device of claim 1, wherein the processor is configured to infer the misalignment between the first and second touch displays using the computed relative position.

13. The computing device of claim 1, wherein the feedback indicates to the user to move the first and second touch displays into alignment with each other.

14. The computing device of claim 1, wherein the feedback indicates to the user which direction to move the first touch display or the second touch display or both.

15. The computing device of claim 1, wherein the feedback indicates a presence or magnitude, or both, of a difference between the computed relative position and a target relative position of the first and second touch displays.

16. The computing device of claim 1, wherein the feedback comprises audible or visual feedback or both.

17. The method of claim 7, further comprising inferring the misalignment between the first and second touch displays using the computed relative position.

18. The method of claim 7, wherein the feedback indicates to the user to move the first and second touch displays into alignment with each other.

19. The method of claim 7, wherein the feedback indicates to the user which direction to move the first touch display or the second touch display or both.

20. The method of claim 7, wherein the feedback indicates a presence or magnitude, or both, of a difference between the computed relative position and a target relative position of the first and second touch displays.

* * * * *